Aug. 2, 1949.  W. J. COULTAS  2,477,687
ADJUSTING MEANS FOR AGRICULTURAL IMPLEMENTS
Filed Jan. 30, 1948  3 Sheets-Sheet 1

INVENTOR.
WILBUR J. COULTAS
BY
ATTORNEYS

Aug. 2, 1949.  W. J. COULTAS  2,477,687
ADJUSTING MEANS FOR AGRICULTURAL IMPLEMENTS
Filed Jan. 30, 1948  3 Sheets-Sheet 2

INVENTOR.
WILBUR J. COULTAS
BY
ATTORNEYS

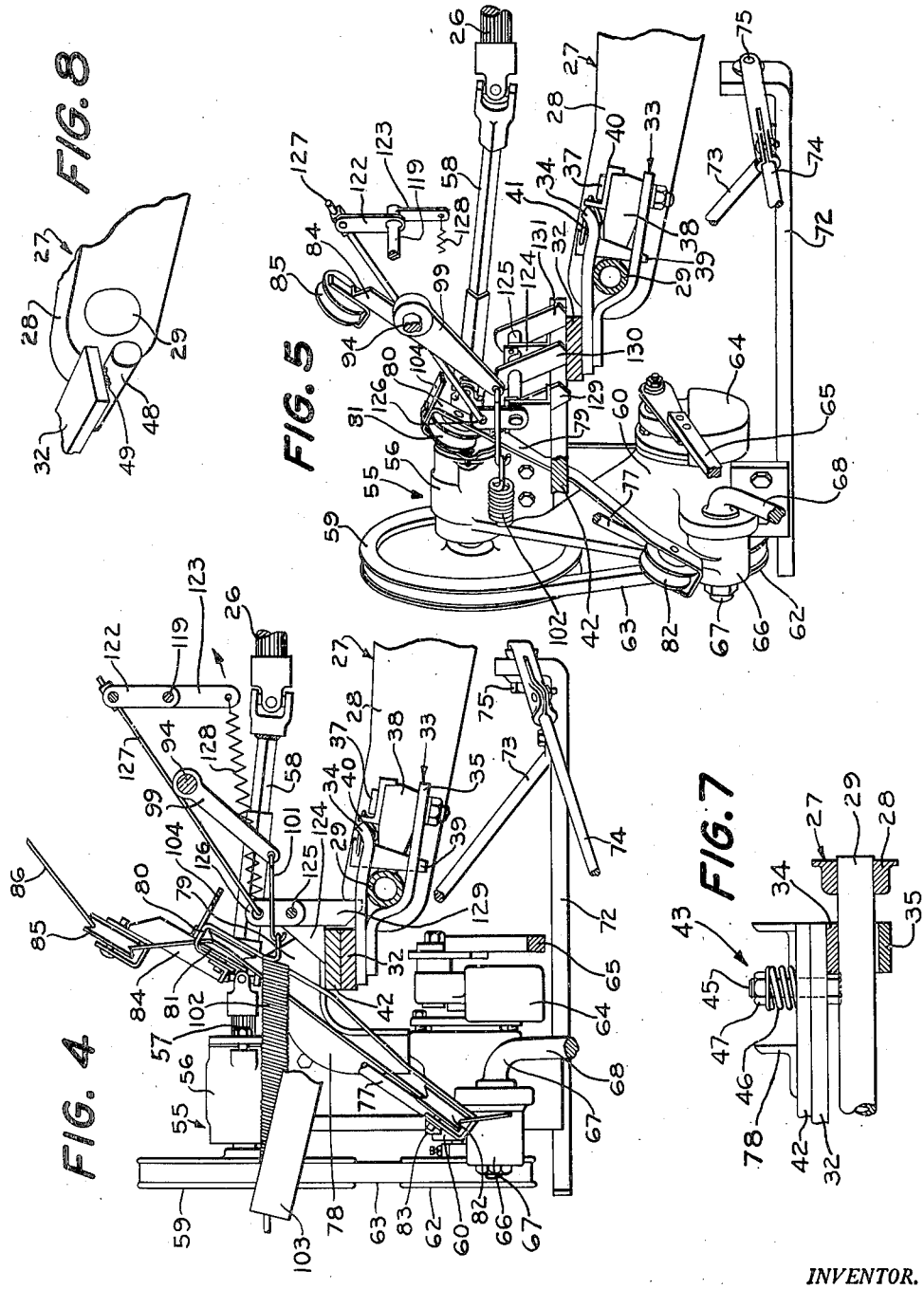

Patented Aug. 2, 1949

2,477,687

UNITED STATES PATENT OFFICE 2,477,687

ADJUSTING MEANS FOR AGRICULTURAL IMPLEMENTS

Wilbur J. Coultas, Moline, Ill., assignor to Deere & Company, Moline, Ill., a corporation of Illinois Application January 30, 1948, Serial No. 5,323

16 Claims. (Cl. 56—25)

This invention relates to an agricultural implement and more particularly to adjusting means for adjusting or raising and lowering an adjustable part of the implement. More particularly, the invention relates to adjusting means for a mower and further to improved mower structure.

The present invention is shown and will be described in connection with a mower of the tractor mounted type, inasmuch as the invention is particularly applicable to an implement of that type; although, the invention with slight modification may be readily adapted to other implements having similar structural and functional characteristics.

In a mower of the type referred to, the tractor is usually provided with carrying structure in the form of a drawbar having a transverse member on which the mower or cutter bar structure is carried. The cutter bar structure includes a laterally extending cutter bar pivotally and releasably connected to the carrying structure or drawbar in such manner that the cutter bar is normally maintained in laterally extending operating position but is releasable in response to the striking of an obstruction thereby so that it may swing rearwardly from the carrying structure, the object being to prevent damage to the cutter bar and its related parts. The cutter bar is further mounted on the mower frame or cutter bar structure in such manner that it may be adjusted vertically by control means including a control lever whereby the operator may raise or lower the cutter bar from an operating to a transport position. In certain types of mowers the cutter bar is additionally mounted for vertical movement into various horizontal planes so that the cutter bar may be positioned at different heights from the ground for the purpose of mowing at the different heights. Furthermore, the combination of connections for the cutter bar provides for disposing the cutter bar at various angles with respect to the horizontal so that mowing may be accomplished on ditch banks, shoulders or other terrain of varying angularity, the latter functions being particularly characteristic of so-called highway mowers.

Because of this latter characteristic, special attention need be given to the means for raising and lowering the cutter bar, particularly in connection with the means which provides for releasable rearward swinging of the cutter bar structure; that is to say, it is desirable to disconnect the raising and lowering means from the cutter bar when the cutter bar structure swings rearwardly and it is further desirable that the means be readily reconnectible when the cutter bar is swung forwardly to its normal operating position.

Several prior constructions are known in which the foregoing results are accomplished and it is the principal object of the present invention to provide improvements in those structures to the end that the mechanism is made more efficient, is simplified, and is positive in its action. In particular, it is an important object of the invention to provide a connectible and disconnectible means between the raising and lowering mechanism and the cutter bar which is disconnectible upon rearward swinging of the cutter bar and is reconnectible upon return of the cutter bar to normal position. It is a further object of the invention to provide such means in a tractor mower of the type in which the mower is carried directly on the tractor, and especially at the rear of the tractor.

Other objects of the invention include: The provision of improved mower structure in which the weight of the component parts is more nearly balanced on the carrying structure; to provide improved means for adjusting the cutter bar and its related parts for the accomplishment of various angles of cutting; and generally to improve the construction and operation of one well known type of tractor mounted mower.

The foregoing and other desirable objects inherent in and encompassed by the invention will become apparent to those skilled in the art as the disclosure of a preferred form of the invention is more fully made in the following detailed description and accompanying sheets of drawings.

In the drawings:

Figure 4 is a fragmentary sectional view taken substantially along the line 4—4 of Figure 2 and showing interior construction of the mower not shown in Figure 1;

Figure 5 is a view similar to that in Figure 4 but showing the mower frame or cutter bar structure in the position assumed when it is at least partially swung back from the carrying structure;

Figure 6 is a fragmentary sectional view taken on the line 6—6 of Figure 1 and showing the mounting of the control lever and its related parts;

Figure 7 is a fragmentary sectional view taken substantially on the line 7—7 of Figure 2 and showing the pivotal connection of the cutter bar structure to the main supporting member of the mower; and Figure 8 is a fragmentary perspective view showing that end of the main supporting member which carries part of the releasable means for maintaining the mower in normal operating position.

Figure 1:
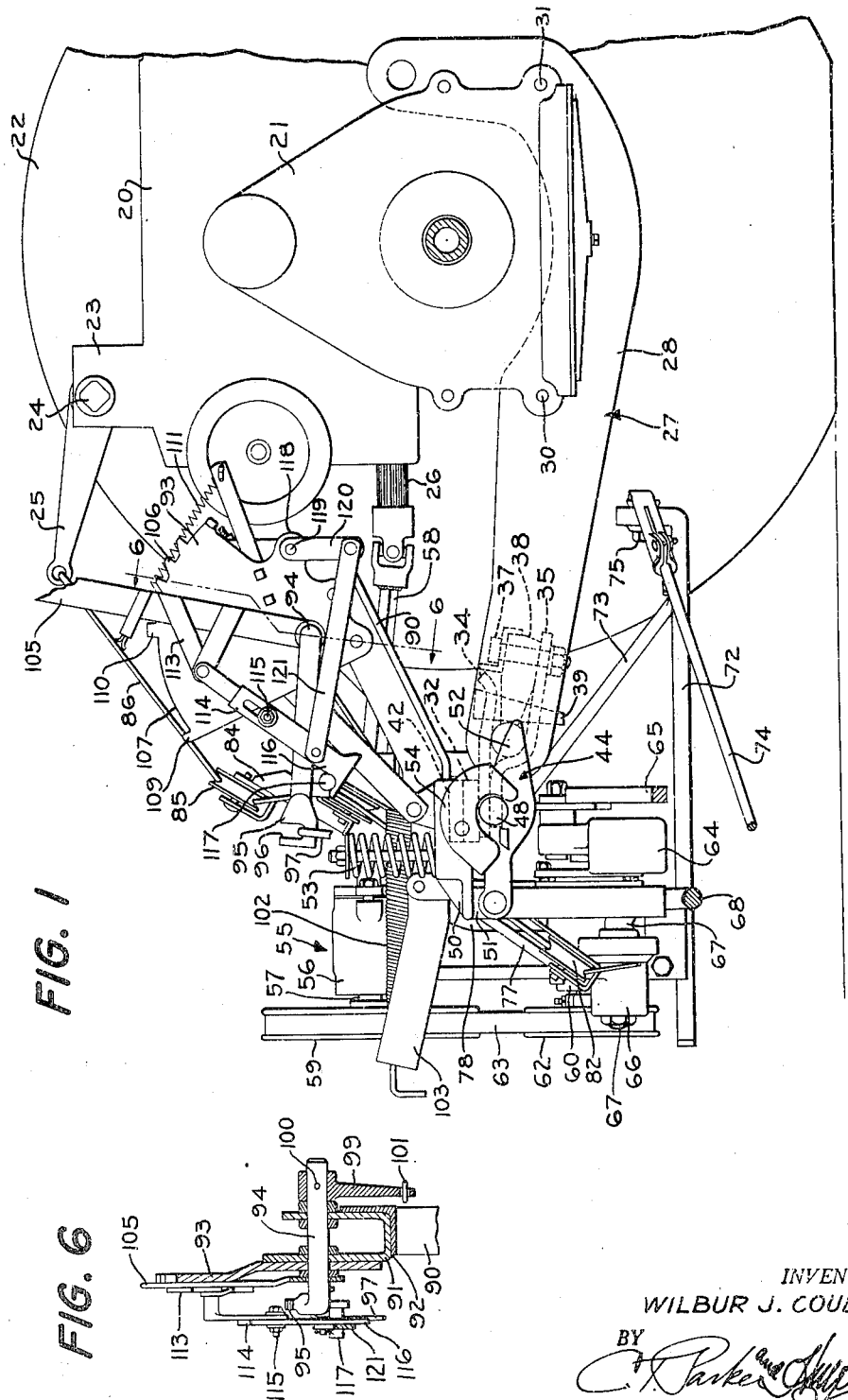
Figure 1 is a side elevational view, partly in section, of a mower carried on the rear portion of a tractor.

The tractor chosen for the purposes of illustration is of a well known type and only the rear portion thereof is shown. This tractor is illustrated as having a main longitudinally extending body 20 having depending housing structure 21 and rear traction wheels 22. The rear portion of the body 20 is shown as including a power control housing 23 which may contain suitable hydraulic power control means such as that disclosed in the U. S. patent to Worthington, 2,403,422. The exterior parts of such control mechanism appear in the drawings here and, as far as is essential to the present case, include a transverse rockshaft 24 to one end of which is fixed a rearwardly extending control arm 25. It will be understood, from reference to the patent identified above, that the rockshaft 24 is rocked by means of a hydraulic motor contained within the tractor body 20 for the purpose of rocking the arm 25 up or down at the will of the operator. The tractor further includes a rearwardly extending power source in the form of a power takeoff 26, which may be of any conventional construction.

The tractor serves as carrying structure for the mower and to that end is provided with supporting structure in the form of a rearwardly extending drawbar, designated generally by the numeral 27. This drawbar includes a pair of transversely spaced longitudinally, rearwardly extending side portions 28 carried at their forward ends on the depending housing structure 21 and rigidly cross connected at their rear ends by a transverse support or frame member 29. The numerals 30 and 31 designate the longitudinally spaced attaching points of the drawbar 27 to the depending housing structure 21.

The mower structure includes a main transverse supporting member 32 which is connected to and supported on the transverse member 29 of the drawbar 27. The means for supporting the member 32 on the member 29 includes structure having a pair of transversely spaced, forwardly opening U-shaped elements 33, each of which includes an upper apertured leg portion 34 and a lower apertured leg portion 35. The lower leg portions 35 are preferably formed of one piece of material and are connected together by a transverse intermediate portion 36 which is centrally and vertically apertured to receive a hitch pin 37 which in turn is received by an apertured forward extension 38 on the transverse drawbar member 29. The apertures in the respective upper and lower portions 34 and 35 are aligned to receive locking members in the form of wedges 39. The wedges 39 are inserted through the apertured portions 34 and 35 ahead of the transverse drawbar member 29 and the combination of the wedges and the hitch pin 37 rigidly secures the member 32 to the drawbar. The hitch pin 37 carries thereon an apertured clip 40 and each of the wedges 39 is apertured so that a flexible connecting element 41 may be passed therethrough to loosely join the three elements together. The arrangement is such that the mower may be easily disconnected from the tractor by withdrawing the wedges 39 and hitch pin 37, after which the tractor may be driven forwardly away from the mower. The reverse procedure is followed in reconnecting the drawbar to the mower.

The mower structure includes a second member 42 which is normally disposed on top of the member 32 and connected thereto by means including a pair of transversely spaced apart connections, one of which is a pivotal connection, indicated generally by the numeral 43 (Figures 2 and 7), and the other of which is a releasable connection, indicated generally by the numeral 44 (Figure 1). As best shown in Figure 7, the proximate ends of the members or bars 32 and 42 are vertically apertured in alignment to receive a vertical pivot pin 45 which includes a short coil spring and nut 46 and 47. The general construction of pivotal connection between comparable mower parts is believed to be sufficiently well known to those skilled in the art as to require no further explanation or illustration.

The opposite or grassward end of the member 32 includes a pintle 48 (Figures 1 and 8) which is rigidly secured, as by welding at 49, to the member 32. The proximate end of the member 42 is provided with a bracket 50 having a depending portion 51 on which is pivoted a vertically swinging latch member 52. The upper portion of the latch member is recessed to receive the lower portion of the pintle 48 and is normally spring-pressed in that position by means of a compression spring 53. A second pivoted latch member 54 is carried by the bracket member 50 and is normally positioned to engage the upper portion of the pintle 48. The arrangement is such that the members 52 and 54 may spread apart against the action of the spring 53 to permit release of the right hand or grassward end of the member 42 from the supporting member 32. The particular latch structure shown is similar to that in the U. S. patent to Coultas 2,292,362, to which reference may be had for a further detailed description of the mechanism. It should be understood, however, that the latch means presently illustrated is but representative of many types of latches utilized for these purposes.

The supporting structure of the mower further includes at the left hand or stubbleward side of the supporting member 42 a casting or housing structure, indicated generally by the numeral 55, which comprises means for carrying many of the component parts of the mower. The casting structure includes an upper portion 56 which serves as a bearing for journaling a short longitudinal shaft 57, which is suitably connected to the power take-off shaft 26 of the tractor by means of a power transmitting connection, indicated generally by the numeral 58, and including universal joints and suitable telescopic shaft sections, a construction which is but representative of many conventional forms. The short shaft 57 projects at the rear of the journaling portion 56 and has keyed thereto a relatively large driving pulley 59. The lower portion of the casting structure 55 includes a lower journaling portion 60 in which is journaled a shaft 61 (Fig. 3) parallel to the shaft 57 and having at one end thereof a drive pulley 62 about which and the drive pulley 59 a belt 63 is trained. The opposite end of the lower shaft includes a counterbalanced crank 64 to which is connected a pitman 65, the rotating crank serving to reciprocate the pitman 65 in a manner well understood.

The casting structure 55 additionally includes at its lower portion a bearing 66 providing a pivot on a horizontal longitudinal axis for the inner bent end 67 of a laterally and grasswardly extending coupling or dragbar 68, the dragbar 68 thus being mounted for vertical swinging movement about the axis through the bearing 66. The outer or grassward end of the dragbar 68 includes a casting 69 which may be of well known construction and which includes a pivot 70 on a horizontal longitudinal axis for carrying a cutting mechanism including a cutter bar 71. The cutter bar may carry the usual knife (not shown) which is reciprocated by the reciprocating pitman 65 previously described.

Figure 2:
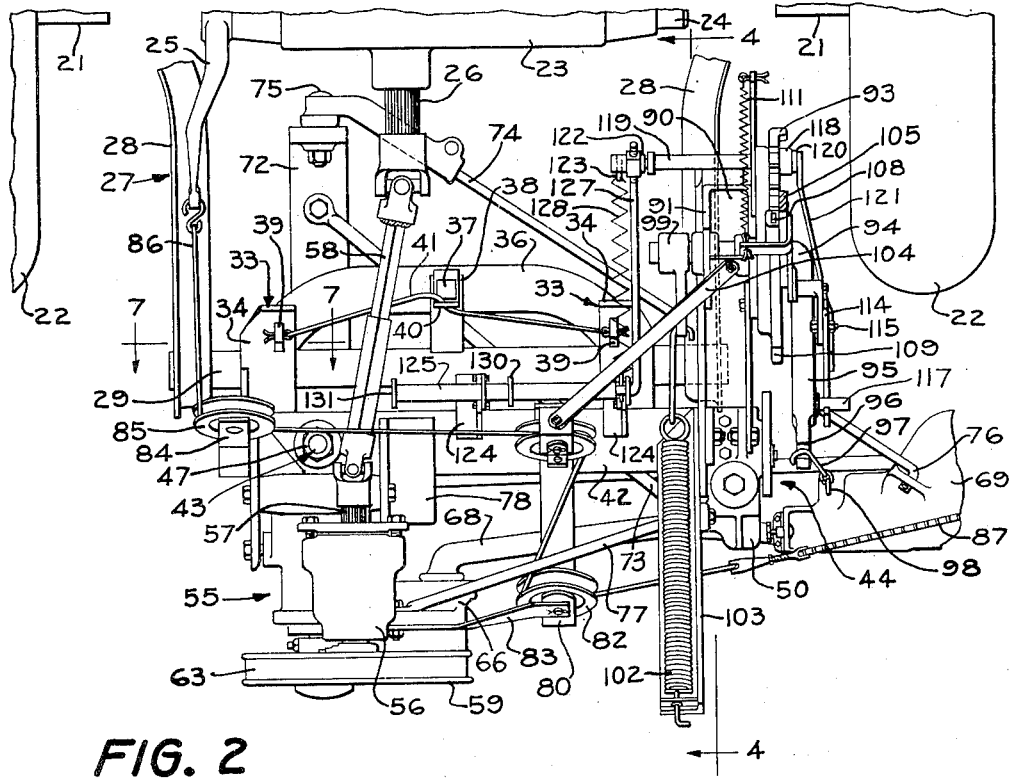
Figure 2 is a plan view of the same.

The bottom portion of the casting structure 55 has rigidly secured thereto a longitudinally, forwardly extending support 72 which is braced by a diagonal brace 73 attached to the end of the member 42 that carries the latch parts 52 and 54 and which accommodates the forward end of a rearwardly and diagonally extending brace 74. The connection of the forward end of the brace 74 to the forward end of the support 72 is by means of a pivot 75. The rear end of the brace 74 is pivotally connected at 76 to the casting or yoke 69 (Figure 2). The bracing structure, although arranged to adequately brace the cutter bar structure against ordinary fore and aft stresses and strains, is pivoted in such manner as to permit rise and fall of the cutter bar structure, including the drag bar 68, about the pivot at 66. The outer or right hand end of the supporting member 42 that carries the casting or bracket 50 is connected by means of a laterally extending brace 77 (Figures 2 and 3) to the casting structure 55. The casting structure 55 is further carried on the transverse supporting member 42 by an inverted L-shaped bracket 78.

Figure 3:
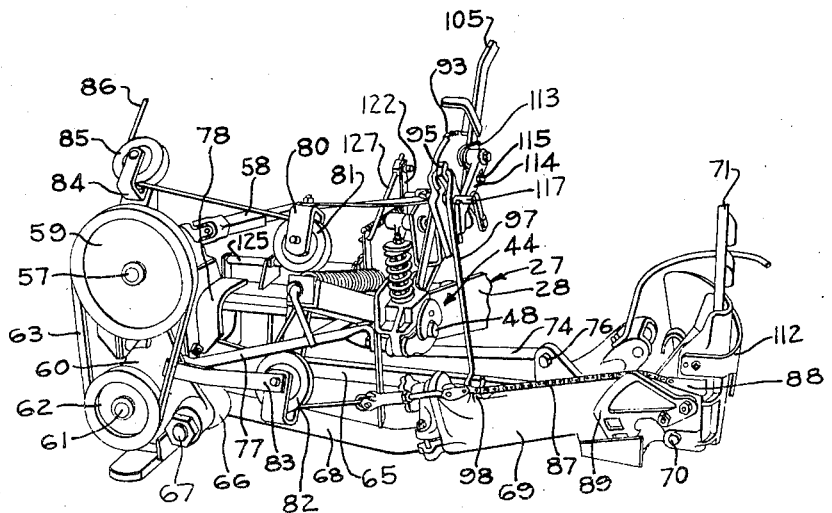
Figure 3 is a perspective view, taken from the rear, and omitting part of the tractor.

The transverse supporting member 42 carries rigidly at its upper surface a small upstanding bracket 79 (Figures 4 and 5) on which is supported the upper portion of an upwardly and forwardly inclining strap member 80. The upper portion of the strap member carries rotatably therein a sheave or pulley 81 and the lower portion of the strap member rotatably carries a second pulley or sheave 82. The lower portion of the strap member is further braced by means of a short transverse brace 83 connected to the casting structure 55 (Figures 2, 3 and 4). The stubbleward and upper portion of the casting 55 is provided with a bracket 84 on which is rotatably carried a third sheave or pulley 85. These sheaves serve as part of the means forming a connection between the rockshaft power arm 25 and the cutter bar 71, whereby power is transmitted from the rockshaft 24 to raise and lower the cutter bar about its pivot 70 (Figure 3). The connection is shown here as including a flexible element, such as a cable 86, connected at one end to the arm 25, trained about the sheaves 85, 81 and 82 and connected at its other end to a chain 87 which is associated in the conventional manner with the inner end of the cutter bar 71, as at 88, the chain passing over a sector 89 to provide for increasing the leverage applied to pivot the cutter bar 71 vertically about the pivot 70.

The right hand or grassward end of the transverse supporting member 42 has rigidly carried thereby a forwardly extending supporting member 90. The forward end of this member serves as a base for a U-shaped bracket 91 (Figure 6) which is secured, as by welding at 92, to the member 90. The outer wall portion of the bracket 91 carries rigidly thereon an upstanding quadrant 93 and the lower portion of the quadrant and the walls of the bracket 91 are apertured in alignment to provide a bearing which carries rockably therein a rockshaft 94 disposed transversely of the mower structure. The outer or grassward end of the rockshaft 94 is provided with an adjusting arm 95, this arm being preferably formed as an integral part of the rockshaft and angularly related thereto. The rear end portion of the arm 95 is provided as a slot or hook 96 for the purpose of receiving the upper end of a depending link 97, the lower end of which is connected at 98 to the casting or yoke 69 (Figure 3).

The arrangement of the rockshaft 94, adjusting arm 95 and link 96 with respect to the casting or yoke 69 is such that rocking of the rockshaft will raise and lower the cutter bar structure about the pivot at 66. The inner end of the rockshaft 94 carries a depending arm 99 which is preferably pinned at 100 to the rockshaft for movement therewith. The lower end of the arm 99 is apertured to receive the hook end of a longitudinally extending link 101 which has a rear hook end connected to the forward end of a tension spring 102. The rear end of the spring is connected to a rearwardly extending supporting arm 103 rigidly carried by a right hand end portion of the transverse member 42 adjacent the bracket 50 previously described. The tension on the spring 102 is so adjusted as to balance the weight of the cutter bar structure through the link 101, arm 99, rockshaft 94, arm 95 and link 97, a function that is well known in mowers of this type. An additional brace 104 is provided between the upper end of the strap member 80 and the bracket 91.

In the mower illustrated, power from the power control mechanism that rocks the rockshaft 24 and power lift arm 25 is utilized for the purpose of raising and lowering the cutter bar 71. It is desirable, however, that vertical adjustment of the coupling or drag bar 68 about its pivot 66 be accomplished manually. For this purpose there is provided a manually operable control lever 105 which has its lower end journaled on the rockshaft 94 adjacent the quadrant 93. In other words, the lever 105 is free to rock at times independently of the adjusting arm 95, in a manner that will presently appear. The quadrant 93 includes a forward toothed portion 106 and a rear untoothed portion 107. The lever 105 may be equipped with the usual detent mechanism, as at 108 (Figure 2), for cooperation with the toothed portion 106. When the lever 105 is in the position shown in Figure 1, or any position forwardly thereof, the detent mechanism 108 will cooperate with the toothed portion 106 to maintain the lever 105 in a fixed position. However, when the lever is moved to the rear so that it is within the range of the untoothed portion 107, it is not locked and is free to swing angularly between a pair of stops 109 and 110 on the quadrant 93. A tension spring 111 is connected between the quadrant and the lever for maintaining the lever 105 toward its forward position. As will be hereinafter more fully pointed out, the lever 105 occupies the position between the stops 109 and 110 when the cutter bar structure is in operating position, at which time the inner end of the cutter bar will ride on a shoe 112 of conventional construction.

According to the present invention, there has been provided an improved means for connecting the lever 105 to the adjusting arm 95 so that the two may be moved together; that is to say, so that the lever 105, which is journaled on the rockshaft 94, may be connected in operative relation to the adjusting arm 95 for the purpose of adjusting the coupling or drag bar 68 vertically. This means further includes releasable or separable mechanism for disconnecting the lever 105 and arm 95.

The lever 105 is provided at its outer face with a rearwardly extending bracket 113 to which is pivotally connected the upper end of a depending and rearwardly extending latch member 114, this member preferably being made in two pieces to provide for vertical adjustment thereof, as indicated by the slot and cap screw 115. The lower end of the latch member 114 is provided as a hook 116 which provides one of a pair of connectible and disconnectible elements, the other of this pair being provided by a transverse short pin 117 carried by the adjusting arm 95. When the latch member 114 is engaged with the pin 117, the lever 105 is operatively connected to the arm 95.

The forward end of the quadrant 93 includes a bearing 118 in which is journaled a short transverse rockshaft 119, the outer end of which has fixed thereto a depending lever 120 pivotally connected at its lower end by a rearwardly extending link 121 to a lower portion of the latch member 114.

The inner end of the rockshaft 119 has keyed thereto an upstanding actuating lever 122 and has further keyed thereto a depending lever or arm 123.

The transverse supporting member 42 carries a pair of transverse brackets including bearings 124 in which is journaled a third transverse rockshaft 125. The right hand or grassward end of this rockshaft has keyed thereto an upstanding arm 126 which is connected by a forwardly and upwardly extending link 127 to the upper end of the arm 122 on the rockshaft 119. The arm 126 is also connected by means of a tension spring 128 to the lower end of the arm 123 on the rockshaft 119. The arm 126 thus provides an anchor for the spring 128, the tension on which is such as to tend to urge the rockshaft 119 in a clockwise direction, as viewed in the drawings. Urging of the rockshaft 119 in this direction tends to apply pressure through the link 121 to the latch member 114 and thus tends to keep the latter in position to either engage or become engaged with the pin 117 on the arm 95. In view of the fact that the lever 105 is journaled on the rockshaft 94 and normally is positioned in the range of the untoothed portion 107 between the stops 109 and 110, it will be seen that the lever 105 may be moved rearwardly so as to free the hooked portion 115 on the latch 114 from the pin 117, inasmuch as the cutter bar structure will be riding on the ground. However, the link 121, being affected by the action of the spring 128, will maintain the latch 114 in position always to engage the pin 117 on the arm 95, except when the cutter bar structure is released from the supporting structure, as will hereinafter be more fully described.

The third rockshaft 125 provides part of a means to control the engagement and disengagement between the latch 114 and pin 117 on the adjusting arm 95. For this purpose the rockshaft carries rigidly thereon a plurality of depending lever arms 129, 130 and 131 (Figure 5). The bearing brackets 124 which carry the shaft 125 are so positioned that the normal position of the levers 129, 130 and 131 is that shown in Figure 4; that is to say, the levers extend downwardly from the rockshaft 125 and ahead of the forward edge of the fixed transverse member 32 on the tractor drawbar 27, so that when the cutter bar structure is released to pivot rearwardly about the vertical axis through the pivotal connection 43 at the left side of the mower structure, the member 42 will move rearward relative to the member 32 and the member 32 will thus be in the path of the lower ends of the arms or levers 129, 130 and 131. As the members 42 and 32 separate, the levers or arms 129, 130 and 131 will successively engage the member 32 so as to effect counterclockwise rocking of the rockshaft 125, which will in turn, through the link 127, effect counterclockwise rocking of the second rockshaft 119. This action will swing the depending lever arm 120 forwardly and will draw the link 121 forwardly, which will result in swinging the latch member 114 also forwardly and out of position with respect to the pin 117 on the adjusting arm 95.

In the normal position of the parts, the members 42 and 32 lie in juxtaposition or parallelism. Because of the pivotal connection at 43 between the two members, relative movement therebetween is such as to destroy the parallelism between the members and create a rather wide angle therebetween, this angle increasing as the member 42 swings rearwardly with respect to the member 32. It is for this reason that there are a plurality of levers, such as those indicated at 129, 130 and 131. Upon initial rearward swinging of the member 42 with respect to the member 32, the outermost lever or arm 129 will be the first to be affected; although, all levers will be moved, because they are rigid on the rockshaft 125. As best shown in Figure 5, the maximum rearward swinging of the member 42 with respect to the member 32 will cause the lever or arm 129 to leave the upper surface of the member 32. If the lever or arm 129 were the only one, the departure between the arm and member 32 would permit the rockshaft 125 to be returned to its original position by action of the spring 128. However, the second arm 130 still stays on the upper surface of the member 32, and prevents return rocking of the rockshaft 125. Now, should the member 42 become swung rearwardly to a still greater extent the lever 130 would also leave the upper surface of the member 32. However, the third lever or arm 131 will still engage the member 32, being positioned relatively close to the pivot means 43. The levers or arms 129, 130 and 131 not only provide means for rocking the rockshaft 125 but further provide means for retaining the rockshaft in its rocked position. The under surfaces of the levers or arms 129, 130 and 131 and the forward and upper surfaces of the transverse lever 32 provide cooperative cam elements for controlling the rockshaft 125.

In the operation of the mower, all the parts are substantially in the position shown in the drawings, with the exception of Figure 5 and with the exception of the lever 105 in Figure 1. This lever, as aforesaid, is moved to the position corresponding to the range of the untoothed portion 107 of the quadrant 93. The control levers or arms 129, 130 and 131 are positioned as shown in Figure 4 and the control linkage to the latch member 114 is in neutral position; that is to say, the parts are in such position as to maintain or condition the latch member 114 for engagement with the pin 117 on the adjusting arm 95. Assuming that the mower will be operating over conditions in which the cutter bar 71 can be operated horizontally, the cutter bar will extend substantially as a continuation of the coupling or drag bar 68. Sufficient slack is permitted in the lifting cable 86 so that the cutter bar 71 and drag bar 68 may have relative free vertical movement within limits about their pivots 70 and 66 to accommodate unevenness in ground contour. The floating movement of the drag bar 68 about its pivot at 66 may occur without a resultant swinging of the lever 105 back and forth, which would be the condition were the lever permanently connected to the linkage for raising and lowering the drag bar. As shown, however, comparatively extreme vertical movement of the drag bar 68 may occur without affecting the position of the lever 105.

Assuming now that it is desired to operate the cutter bar at a substantial height above the ground, the lever 105 will be moved forwardly and appropriately positioned with respect to one of the teeth in the toothed portion 106 of the quadrant 93. This will establish a desired height of the drag bar 68. The power control mechanism may now be operated to determine the position of the cutter bar 71. Again, even though the lever 105 is fixed with respect to the quadrant 93, there can be substantial vertical movement of the drag bar 68 without affecting the lever 105, inasmuch as the engagement between the pin 117 and the hook end 116 of the latch 114 occurs only on downward movement of the drag bar 68.

From the foregoing, it will be clear that raising and lowering the cutter bar itself is accomplished through the power control mechanism including the arm 25, cable 86 and sheaves 81, 82 and 85 and the chain 87 and connections 88 and 89. Raising and lowering of the drag bar 68 is accomplished by means of the control member 105 and the connection including the latch 114 and pin 117 on the arm 95.

When the cutter bar 71 strikes an obstruction that impedes its forward progress, the release mechanism 44 operates and the pivoted members 52 and 54 spread apart and escape from the pintle member 48, thus allowing the cutter bar structure to swing rearwardly about the pivotal connection 43 as the tractor continues forwardly. The sheaves 81, 82 and 85, and particularly the sheave 85, are so arranged as not to interfere with the rearward swinging of the cutter bar structure with respect to the tractor drawbar, the sheave 85 being located substantially vertically above the pivot 43. Consequently, there will be no adverse effect on the cutter bar itself. Even though the control lever 105 and its associated parts are carried on the same supporting structure that swings rearwardly with the cutter bar structure, it is desirable to release the latch member 114 from the adjusting arm 95 so that the cutter bar structure may be free to follow ground contour as it swings rearwardly. It has been found that freeing the cutter bar structure from the lifting mechanism prevents damage to the parts and provides for a cleaner breakaway of the cutter bar structure from the carrying structure. As previously stated, initial rearward swinging of the cutter bar structure, which includes the transverse member 42, causes counter-clockwise rocking of the rockshaft 125 as the levers or arms 129, 130 and 131 are cammed upwardly by the upper surface of the transverse supporting member 32. This rocking of the rockshaft 125 effects a release of the latch 114 from the pin 117, and the cutter bar structure will be free from the lever 105, to follow its own path in rearward swinging; that is to say, its own vertical path with respect to any depressions in the ground.

Reconnection of the cutter bar structure to the carrying structure is effected by backing the tractor until the pivoted members 52 and 54 again reengage the pintle 48 on the member 32. Inasmuch as the third lever or arm 131 has not left the upper surface of the member 32, the other levers 129 and 130 may freely ride back over the upper surface of the member 32 to return to their normal positions as shown in Figure 4. Return rocking of the rockshaft 125 is effected by the spring 128, and the linkage between the rockshaft 119 and the latch member 114 restores the latch 114 to its original position to engage or become engaged with the pin 117 on the adjusting arm 95. The operator of the tractor, being then aware of the obstacle, now raises the cutter bar 71 sufficiently to pass over the obstacle, and lowers the cutter bar and continues operating as before.

The foregoing pertains to the detailed structure of the preferred embodiment of the invention and the operation thereof in field conditions. The mower structure itself is a compact organization efficiently arranged with respect to the supporting member 42 and well balanced over the transverse member 29 of the drawbar 27. The mower may be similarly arranged with respect to other carrying structure or with respect to a carrying structure of the type located ahead of the traction wheels, as is the case in conventional highway mowers, all of which essentials are well understood by those skilled in the art. The control mechanism for effecting connection and disconnection of the latch 114 from the pin 117 on the arm 95 is simple in construction and is positive in action. Other features of the invention will be readily apparent to those versed in the art, as likewise will be numerous modifications and alterations in the preferred construction illustrated. It is therefore not desired to limit the invention by the precise structural and functional details set forth herein.

I claim:

1. In a mower including carrying structure and cutter bar structure extending normally in operating position transversely thereof and connected thereto by means including a pivotal connection having vertical and horizontal axes and a transversely spaced release device so that the cutter bar structure may move up and down with respect to the carrying structure and further may move rearwardly when released, and futher having a movable control member releasably connected by a movable latch to the cutter bar structure for moving the cutter bar structure up and down, the improvement residing in means for releasing the latch between the cutter bar structure and control member in response to rearward swinging of the cutter bar structure, comprising: an actuating member for fixed connection to one structure; a rockshaft for mounting on the other structure so that the rockshaft and member have relative movement when the cutter bar structure swings rearwardly; means for operatively connecting the rockshaft to the movable latch; and means carried by the rockshaft and engageable with the actuating member to effect rocking of the rockshaft, and consequently to effect release movement of the latch, when the cutter bar structure swings rearwardly.

2. The invention defined in claim 1, further characterized in that: the last named means comprises an arm fixed to the rockshaft and engageable by the actuating member to be moved by the member in response to relative movement between the actuating member and rockshaft as the cutter bar structure swings rearwardly.

3. The invention defined in claim 1, further characterized in that: the rockshaft and actuating member are parallel; and the means on the rockshaft engageable with the actuating member comprises a plurality of arms fixed to the rockshaft and engageable by the actuating member to be moved by the member in response to relative movement between the actuating member and rockshaft as the cutter bar structure swings rearwardly.

4. The invention defined in claim 1, further characterized in that: the actuating member is transversely positionable between the pivotal connection and the release device that connects the cutter bar structure to the carrying structure; the rockshaft is substantially parallel to the actuating member; and the means on the rockshaft engageable with the actuating member comprises a plurality of arms fixed to the rockshaft and engageable by the actuating member to be moved by the member in response to relative movement between the actuating member and rockshaft as the cutter bar structure swings rearwardly.

5. The invention defined in claim 1, further characterized in that: spring means is provided for reversely rocking the rockshaft; and means are included for maintaining the rockshaft in rocked position against the action of said spring means until the cutter bar structure is returned to operating position, comprising an operating element engageable between the actuating member and rockshaft and displaceable by relative movement between the actuating member and rockshaft incident to return of the cutter bar structure to operating position.

6. The invention defined in claim 1, further characterized in that: the member is positionable transversely between the pivotal connection and the release device that connects the cutter bar structure to the carrying structure; the rockshaft is substantially parallel to the actuating member; so that as said member and rockshaft move relatively when the cutter bar structure swings rearwardly the parallelism therebetween is destroyed; and the means for rocking the rockshaft includes a plurality of arms fixed to the rockshaft and spaced thereon along the axis thereof and respectively having portions engageable with the member as the member and rockshaft move relatively.

7. In a tractor mower arrangement wherein the tractor includes a carrying structure having a transverse member and the mower includes cutter bar structure extending normally in operating position transverse to the tractor and is connected to the carrying structure by means including a pivotal connection having vertical and horizontal axes and a transversely spaced release device so that the cutter bar structure may move up and down with respect to the carrying structure and further may move rearwardly when released, and further having a movable control member releasably connected by a movable latch to the cutter bar structure for moving the cutter bar structure up and down, the improvement residing in means for releasing the latch between the cutter bar structure and control member in response to rearward swinging of the cutter bar structure, comprising: a rockable member for mounting on the mower to swing rearwardly with the cutter bar structure relative to the transverse member; means for operatively connecting the rockable member to the latch for moving the latch to release same from its connection between the control member and cutter bar structure; and means engageable between the rockable member and the transverse member to rock the former incident to relative movement between the two as the cutter bar structure swings rearwardly.

8. In a tractor mower arrangement wherein the tractor includes a drawbar having a transverse portion and the mower includes cutter bar structure extending normally in operating position transverse to the tractor and is connected to the drawbar by means including a pivotal connection having vertical and horizontal axes and a transversely spaced release device so that the cutter bar structure may move up and down with respect to the drawbar and further may move rearwardly when released, and further having a movable control member releasably connected by a movable latch to the cutter bar structure for moving the cutter bar structure up and down, the improvement residing in means for releasing the latch between the cutter bar structure and control member in response to rearward swinging of the cutter bar structure, comprising: a rockable member for mounting on the mower to swing rearwardly with the cutter bar structure relative to the transverse member; means for operatively connecting the rockable member to the latch for moving the latch to release same from its connection between the control member and cutter bar structure; and means engageable between the rockable member and the transverse drawbar portion to rock the former incident to relative movement between the two as the cutter bar structure swings rearwardly.

9. The invention defined in claim 8, further characterized in that: the rockable member includes a rockshaft paralleling the transverse drawbar portion; and the means engageable between the rockable member and drawbar portion includes a plurality of transversely spaced arms fixed to the rockshaft and engageable with the drawbar portion as the rockshaft and drawbar move relatively incident to rearward swinging of the cutter bar structure.

10. A tractor mower for use with a tractor having a rearwardly extending drawbar of the type having a transverse supporting member, comprising: a first transverse frame member; means for mounting said frame member generally directly above and on the transverse drawbar member; a second transverse frame member arranged to lie on top of and be supported by the first frame member; means connecting the two frame members together adjacent an end portion of each, including a pivot on a vertical axis so that the second frame member may swing rearwardly with respect to the first frame member; means at the opposite end portions of said frame members including a realeasable latch device on one and a latch-receiving element on the other; cutting mechanism carried by the second frame member rearwardly thereof; control means for the cutting mechanism carried by the second frame member ahead thereof, so that the weight of the control means tends to counterbalance in part the weight of the cutting mechanism with the first and second frame members and the transverse drawbar member as a fulcrum.

11. The invention defined in claim 10, further characterized in that: the first frame member includes forwardly opening U-shaped structure to receive the transverse drawbar member and includes leg portions apertured vertically; and locking means is provided for insertion through said apertured portions ahead of the transverse drawbar member for securing the first member to said drawbar member.

12. In an agricultural implement having first and second members connected together for movement of one with respect to the other in opposite directions, and an implement part connected to one member for movement therewith relative to the other and for adjustment relative to both members, the improvement residing in means for adjusting the implement part, comprising: a control device movable on one member, means between the control device and implement part for adjusting the latter, including a pair of relatively movable connectible and disconnectible elements normally conditioned for connection between the control device and implement part; actuating means including a first part operably connected to one of the elements for moving same and mounted on the first member for movement with respect thereto in a first phase, to move said one element to condition said elements for disconnection when the members move relatively in one direction, and in a second phase to move said one element to condition the elements for reconnection when the members are moved relatively in the other direction, said actuating means including a second part operably engageable between the first part and the second member for moving said first part in its first phase when the members are moved relatively in said one direction; means for moving the first part in its second phase; and means operable between the first part and the second member for temporarily holding said part against second phase movement until the members are moved relatively in said other direction.

13. In an agricultural implement having first and second members connected together for movement of one with respect to the other in opposite directions, and an implement part connected to one member for movement therewith relative to the other and for adjustment relative to both members, the improvement residing in means for adjusting the implement part, comprising: a control device movable on one member; means between the control device and implement part for adjusting the latter, including a pair of relatively movable connectible and disconnectible elements normally conditioned for connection between the control device and implement part; actuating means including a first part operably connected to one of the elements for moving same and mounted on the first member for movement with respect thereto in a first phase, to move said one element to condition said elements for disconnection when the members move relatively in one direction, and in a second phase to move said one element to condition the elements for reconnection when the members are moved relatively in the other direction, said actuating means including a second part operably engageable between the first part and the second member for moving said first part in its first phase when the members are moved relatively in said one direction; and means for moving the first part in its second phase when the members are moved relatively in said other direction.

14. In a mower having a fore and aft extending frame provided with a transverse support, and cutter bar structure connected thereto for rearward swinging relative thereto from normal operating position and including a part movable up and down for adjustment, the improvement residing in means for moving said part for adjustment, comprising: a control lever rockable fore and aft on the cutter bar structure; an adjusting member rockable on the cutter bar structure; means for connecting the adjusting member and the adjustable part; an actuating lever movable on the cutter bar structure; a latch member swingable on the lever between a position of engagement with the adjusting member and a position of disengagement from the adjusting member; a link connecting the latch member and actuating lever; a transverse rockshaft on the cutter bar structure; an arm on the rockshaft and extending into a position to be engaged by the transverse support when the rockshaft and said arm swing with the cutter bar structure rearwardly relative to said support, whereby the rockshaft will be rocked in one direction; means for rocking the rockshaft in the opposite direction when the cutter bar structure returns to normal operating position; and means operably connecting the rockshaft and the actuating lever for moving the latter in response to rocking of the rockshaft.

15. In a mower having a fore and aft extending frame provided with a transverse support, and cutter bar structure connected thereto for rearward swinging relative thereto from normal operating position and including a part movable up and down for adjustment, the improvement residing in means for moving said part for adjustment, comprising: a first transverse rockshaft on the cutter bar structure, an adjusting member fast on said first rockshaft and having means for connection to the adjustable part; a control lever rockable on and with respect to said first rockshaft; a second transverse rockshaft on the cutter bar structure ahead of the first rockshaft; a fore and aft swingable latch on the control lever, in one position thereof engageable in weight-supporting relation with the adjusting member, and in another position thereof disengageable from the adjusting member; an actuating lever fixed on the second rockshaft; a fore and aft extending link connecting the actuating lever and the latch; a third transverse rockshaft behind the first rockshaft; means extending fore and aft and operably connecting the third and second rockshafts for rocking of the latter by the former; and means for rocking the third rockshaft at least in one direction in response to rearward swinging of the cutter bar structure.

16. The invention defined in claim 15, further characterized in that: spring means is provided for rocking the third shaft in the other direction; and means is provided for holding said rockshaft against rocking in said other direction until the cutter bar structure is returned to operating position.

WILBUR J. COULTAS.

No references cited.